United States Patent [19]

Doty

[11] Patent Number: 4,946,196
[45] Date of Patent: Aug. 7, 1990

[54] RETRACTOR WITH MANUALLY-OPERABLE REMOTE CONTROL FOR TENSION-RELIEVING SYSTEM

[75] Inventor: Gerald A. Doty, Crown Point, Ind.
[73] Assignee: Gateway Industries, Inc., Olympia Fields, Ill.
[21] Appl. No.: 176,304
[22] Filed: Mar. 31, 1988
[51] Int. Cl.[5] .............................................. B60R 22/08
[52] U.S. Cl. .................................... 280/803; 280/807; 242/107.4 A
[58] Field of Search ............... 280/802, 804, 806, 807; 297/469, 476, 477, 478; 242/107.4 R, 107.4 A, 107.4 B, 107.7; 335/234

[56] References Cited

U.S. PATENT DOCUMENTS

| | | | |
|---|---|---|---|
| 3,682,412 | 8/1972 | Kuszynski | 242/107.4 |
| 3,700,184 | 10/1972 | Francis | 242/107.4 |
| 3,814,376 | 6/1974 | Reinicke | 335/234 |
| 4,382,563 | 5/1983 | Morita et al. | 280/807 |
| 4,461,493 | 7/1984 | Doty | 280/807 |
| 4,498,689 | 12/1985 | Duffield | 280/807 |
| 4,585,185 | 4/1986 | Ueda | 242/107.4 A |
| 4,669,751 | 6/1987 | Unger | 280/807 |
| 4,751,487 | 6/1988 | Green | 335/234 |

*Primary Examiner*—Charles A. Marmor
*Assistant Examiner*—Karin Tyson
*Attorney, Agent, or Firm*—Fitch, Even, Tabin & Flannery

[57] ABSTRACT

An automotive safety belt retractor comprising a remotely-operable, electromechanical tension-relieving system. The tension-relieving system is shifted into a tension-relieving mode by a conveniently located manual switch. Movement of the user to extract more than a predetermined length of belt while in the tensionless mode shifts the electromechanical actuator from an active to a released position. The electromechanical actuator is normally de-energized and is only energized momentarily when shifting between the tension-relieving and nontension-relieving modes. A second, automatic switch shifts the retractor out of tensionless mode upon opening of the vehicle door.

16 Claims, 3 Drawing Sheets

RETRACTOR WITH MANUALLY-OPERABLE REMOTE CONTROL FOR TENSION-RELIEVING SYSTEM

Background of the Invention

The invention relates generally to retractor mechanisms, and more particularly to an automotive safety belt retractor having a tension-relieving mechanism.

The conventional tension-relieving mechanisms used in seat belt retractor mechanisms are manually set by manually pulling on the belt and then releasing the belt after the belt has been placed about the user. Such tensionless mechanisms also have a comfort feature in which the user may extract a further limited amount of seat belt when moving around without releasing the tension mode. If the user wants to disable the tensionless mechanism, the user may extract more belt than allowed for the tensionless comfort feature and this automatically disables the tensionless mechanism allowing the retractor mechanism to rewind the protracted belt. In these conventional tension-relieving seat belt retractors, the user sets the retractor in a tensionless mode by grasping the belt and pulling it outwardly from the user's body beyond a predetermined distance and then releasing the belt for a small rewind before the tensionless device stops further rewinding. The amount of slack in the tensionless mode has two components, the first being the belt length extracted and the second being the belt length being retracted during the setting of a tension pawl into a tension wheel to stop belt rewind. Thus, the user does not have a direct and immediate understanding and control of the slack in the belt. Of course, the user may, by trial and error, eventually provide the exact amount of slack desired.

The present invention is directed to providing the user with more immediate and direct control over the tension-relieving mechanism as to when it is set so that the user knows very closely how much slack will be present when in the tensionless mode. That is, users will consciously determine how much slack is present by manually setting the tensionless mechanism at the position they desire. The present invention eliminates the user's pulling of the belt outwardly and then releasing the belt in order to set the belt in the tension-relieving mode. The feature of an automatic release by the user's movement and belt protraction beyond the predetermined comfort extraction is also provided and causes an automatic disablement of the tension-relieving mechanism. Likewise, if the user desires to release the tension-relieving mechanism when egressing the vehicle, the user may pull the belt to extend it beyond the comfort zone length causing an automatic rewind of the belt to its fully-wound position.

While the usual tensionless device is a mechanical device that is set with a mechanical manipulation of the belt, electrical solenoid actuators are known but they have involved the use of a continuous operation of the electrical solenoid either during the tensionless mode or after release of the tensionless mode. Typically, such solenoids are energized continuously to pull the solenoid plunger in and the plunger is urged by a spring to its extended position. The operation of the solenoid for long periods of time is a drain on the electrical system. While time delay systems may be built into the electrical circuit, they generally add significantly to the cost of a tensionless system as to make the system noncompetitive from a cost standpoint. Cost as well as durability and maintenance-free characteristics are demanded of retractors and tensionless systems in order to be mass produced and used on a large-scale commercial basis. Complicating any electrical control in these systems is the desire to provide a mechanical disabling or "override" by pulling of the belt beyond the predetermined comfort zone length.

The present invention solves the above problems by providing a commercially-practical automotive retractor having a tension-relieving mechanism which is manually set by the user operating an electrical switch and which may be automatically disengaged either by extending the belt beyond the comfort zone length or by opening of the vehicle door. Although manually-operable tension-relieving mechanisms have been proposed in the past, in Kuszynski U.S. Pat. No. 3,682,412 and Francis U.S. Pat. No. 3,700,184, these proposals do not provide for electrical control of their mechanisms, nor do they provide for automatic disengagement of the tension-relieving mechanism by belt extension beyond a predetermined length.

It is a general object of the present invention to provide a retractor having an improved tension-relieving mechanism which is set by the user operating a manual switch.

Another object of the invention is to provide a manually-operable, electrical control mechanism for shifting a safety belt retractor to tensionless mode with a mechanical overrider release by belt extension.

It is a further object of the invention to provide a safety belt retractor which achieves remote operability with relatively few moving parts, to enable economical manufacture.

It is an additional object of the invention to provide a retractor which automatically shifts out of tensionless mode when the belt is pulled beyond a predetermined length or a door is opened to provide an automatic retraction after use of the belt has terminated.

Additional objects of the invention will become apparent in the following description and accompanying drawings.

Summary of the Invention

The invention comprises an automotive safety belt retractor having a manually-operated, electrical switch operable by the seat belt wearer for shifting the retractor into the tensionless mode and having a mechanical override to shift the retractor out of the tensionless mode. In the preferred embodiment of the invention the retractor can be shifted into tensionless mode only by a manually-operable electrical switch, but can be shifted out of tensionless mode either by manually pulling on the belt to extend the same beyond the comfort zone length or, by an automatic door switch usually operated after termination of belt use. The manually operable switch is located in a convenient location for user access, such as on an arm rest and the belt wearer decides how much slack is desired and then actuates the electrical switch to set the tensionless device.

The preferred retractor includes a spring-driven reel which is normally biased for retraction, and an inertial sensing mechanism for selectively locking the reel. In the preferred embodiment, tensionless operation is provided by pivoting of a pawl which selectively engages a wheel fixedly connected to the reel for rotation therewith, and the position of the pawl is controlled by a double-acting solenoid. The solenoid is de-energized in either of its states to conserve energy and a mechanical override is able to shift the solenoid from its operative tensionless position to its release position. Additional features and advantages of the invention will become apparent from the following description.

Description of the Preferred Embodiments

Figure 1:
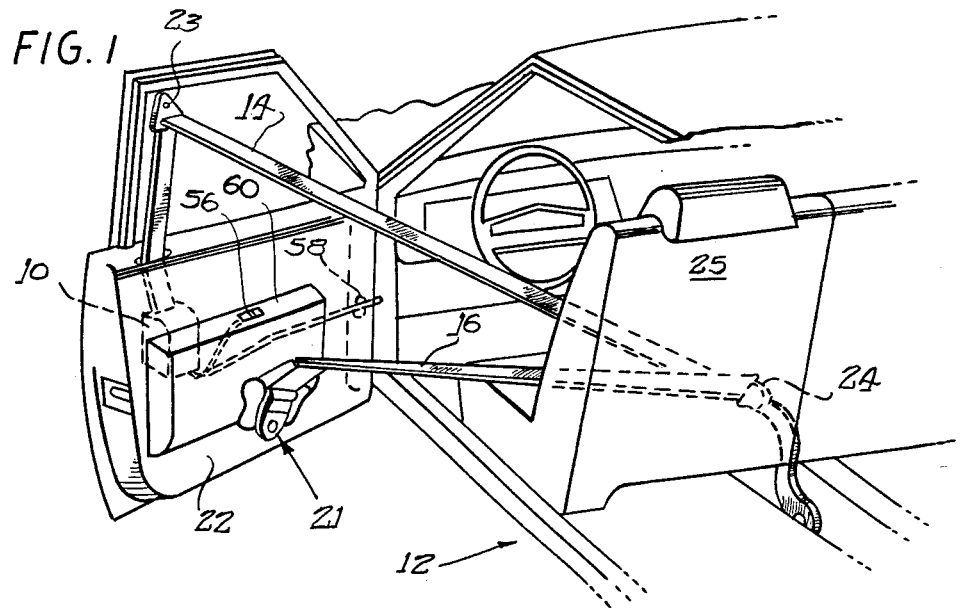
FIG. 1 is a perspective view illustrating a retractor in accordance with the invention, installed in an automobile.

The invention is generally embodied in an automotive safety belt retractor 10 which is shown in FIG. 1 installed in an automobile 12 as part of a passive restraint system which includes a shoulder belt 14 and a lap belt 16. The lap belt 16 and shoulder belt 14 may be different portions of a single belt. The retractor 10 controls the shoulder belt and is mounted within the door 22 of the automobile. A second retractor 21, which will not be discussed independently herein, is mounted on the inside panel of the door 22 to control the lap belt 16.

It will be appreciated that the retractor 10 or modified versions thereof may be used in various restraint systems other than that illustrated in FIG. 1. For example, the retractor 10 may be mounted on the floor of the automobile in a system wherein the driver operates a buckle to secure a shoulder belt and lap belt in place.

The illustrated retractor 10 comprises a frame 18, and a reel 20 mounted for rotation on the frame 18. One end of the shoulder belt 14 is partially wound on the reel 20, extending upward therefrom through a slot in the interior of the door 22 to an overhead support 23 mounted near the top of the door frame, thence downward across the wearer's seat 25 to a floor-mounted support 24. In the illustrated passive system, the support 24 secures one end of the shoulder belt, while the other end is secured by the reel 20. In other embodiments of the invention, a conventional two-part buckle mechanism is used instead of the fixed support 24.

Figure 2:
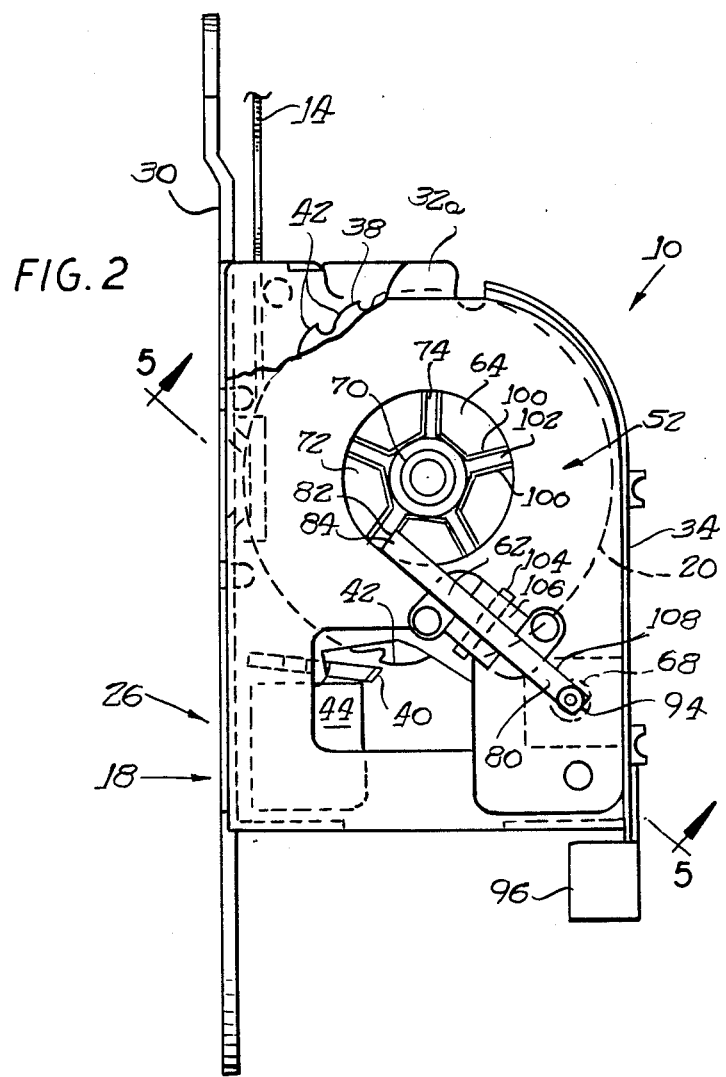
FIG. 2 is a rear elevational view of the retractor of FIG. 1.

Referring to FIG. 2, protraction of the belt 14 rotates the reel 20 in a clockwise direction, and counterclockwise rotation of the reel 20 retracts the belt. Means 26 are provided for selectively locking the reel 20 against clockwise rotation in the event of a collision or other mishap, at which time the belt 14 is to restrain the wearer. To provide for retraction of the belt 14 after use, and to provide tension on the belt during protraction and adjustment of belt length by the wearer, the reel 20 is biased for counterclockwise rotation by a spring 28.

The frame 18 is preferably of one-piece construction, comprising a mounting portion 30 adapted for attachment to the vehicle 12 in order to anchor the retractor in place, and a pair of parallel sidewalls 32a, 32b extending perpendicularly from the mounting portion 30 to support the reel 20 and other components of the retractor 10. To aid in controlling entry of dust into the interior of the retractor 10, a cover 34 (shown in FIG. 2 only) is disposed between the sidewalls 32a, 32b opposite the mounting portion 30.

The reel 20 comprises a shaft 36 and a pair of ratchet wheels 38 affixed thereto just inside the sidewalls 32a, 32b of the frame 18. The ratchet wheels 38 interact with a pivoting latch member 40 as described below, in addition to maintaining the belt 14 in the desired location on the reel 20.

Figure 3:
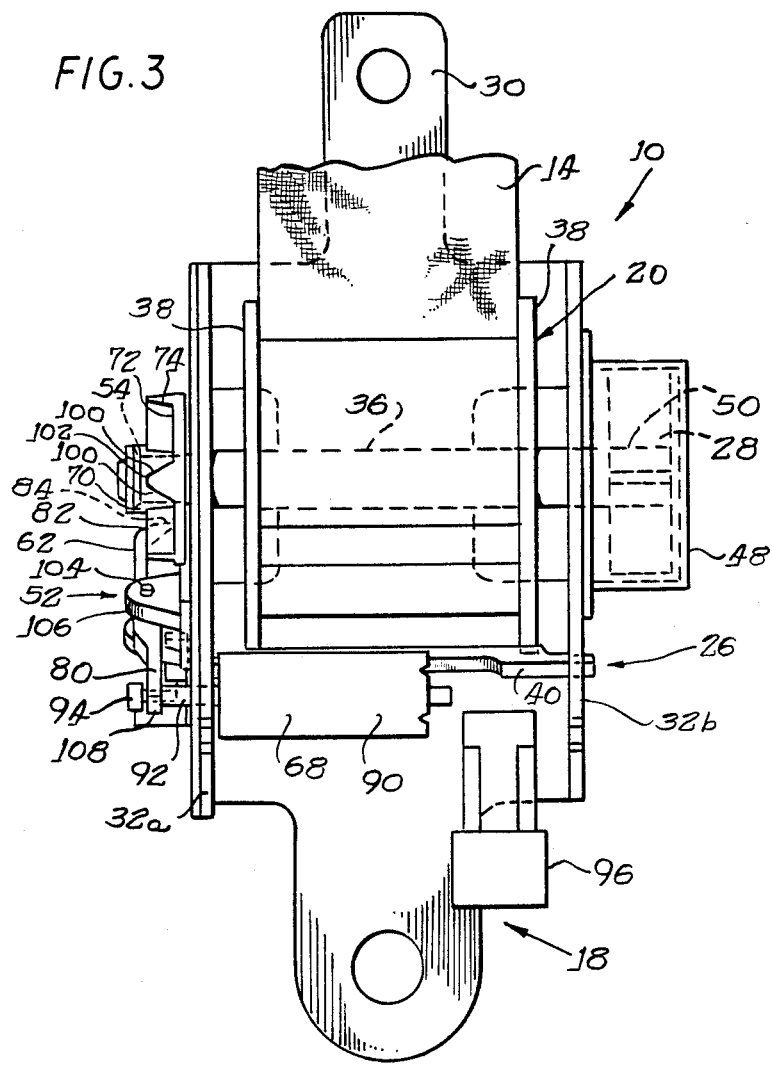
FIG. 3 is a side elevational view of the retractor of FIG. 1.
Figure 4:
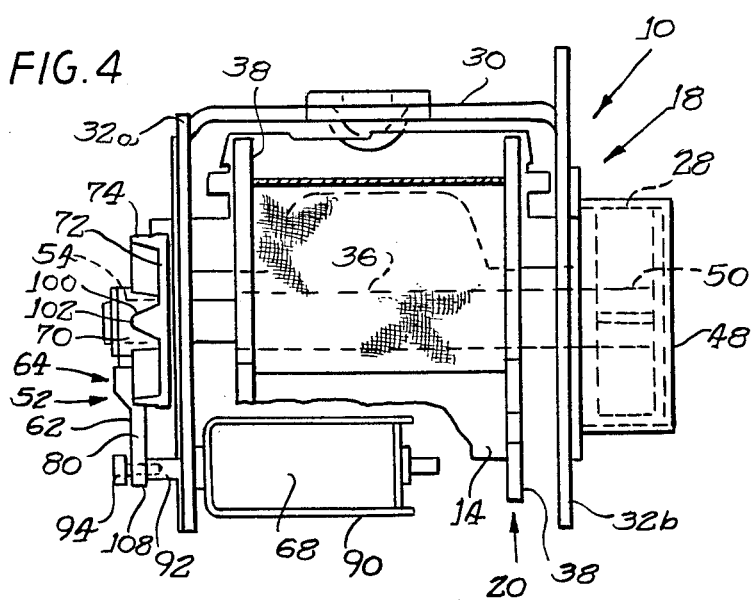
FIG. 4 is a plan view of the retractor of FIG. 1.

The pivoting latch member 40 is movable between a locking position (shown in FIG. 3) in which it engages the teeth 42 on the ratchet wheels 38 and a normal position in which it permits free rotation of the ratchet wheels. An inertially-activated pendulum or other suitable device 44 is employed to shift the latch member 40 from normal to locking position when rapid acceleration or deceleration, or upset of the vehicle, is detected.

The spring 28 which biases the reel 20 for retractive rotation is mounted in an enclosure 48 on the outside of the sidewall 32b. The spring 28 is preferably a spirally-wound length of spring steel having its outer end fixed to sidewall 32b and its inner end attached to shaft 36. The shaft 36 preferably is slotted at the end 50 to receive the inner end of the spring 28. To provide a tensionless mode of operation for the retractor, contributing to wearer comfort, a tension-relieving mechanism 52 is disposed at the opposite end 54 of the reel shaft 36, outside the opposite sidewall 32a.

In accordance with the invention, the tension-relieving mechanism 52 is remotely controlled and set in its tensionless mode by a manually-operable switch 56. In conjunction with an electromechanical control system described below, the manually-operable switch 56 is capable of shifting the retractor 10 either into or out of the tensionless mode. The manual switch 56 is preferably accompanied by an automatic switch 58 for shifting the device out of tensionless mode after termination of belt use, to permit retraction. The automatic switch 58a is preferably operative when opening the vehicle door 22 to shift the retractor out of tensionless mode. Herein, the solenoid is held or determined in each of its positions so that the electrical circuit may be operated only momentarily to shift the solenoid plunger, which will then be detented in its new position.

Figure 7:
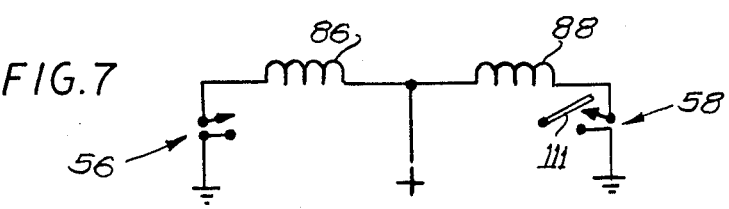
FIG. 7 is a schematic diagram of selected components of the tension-relieving system of the retractor.

The manual switch 56 may be a simple, normally open switch (FIG. 7) which is preferably mounted at a convenient location which the wearer of the shoulder belt 14 can reach from his normal seated position, so that the belt will fit properly after the retractor is shifted to tensionless mode while the user is in his normal position. As shown in FIG. 1, the switch may conveniently be located, for example, on the arm rest 60 of the vehicle door 22.

The tension-relieving mechanism 52 comprises a pawl 62 pivotably mounted on the outside of sidewall 32a, selectively engaging a wheel 64 disposed on the end 54 of the reel shaft 36, and an electromechanical device 68 for selectively pivoting the pawl 62.

Figure 5:
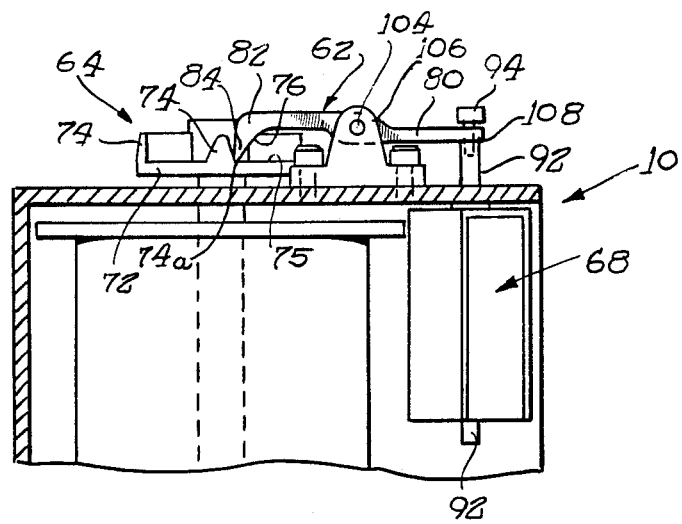
FIG. 5 is a fragmentary view, taken substantially along line 5—5 in FIG. 2, showing the tension-relieving mechanism in locked or active position, preventing application of tension to the safety belt.

The wheel 64 preferably includes a hub 70 fixedly attached to the end 54 of the shaft 36, and further includes a relatively thin annular web 72 with a plurality of teeth or projections 74 thereon for engaging the pawl 62. In the illustrated embodiment, the projections 74 comprise five equally-spaced, generally radially-extending teeth or ribs. Abutting contact of a tip 84 of the pawl 62 with a root area 74a on the forward side of one of the ribs 74 prevents retraction when the pawl 62 is in its locking position, as illustrated in FIG. 5.

To set the retractor in the tensionless mode, the operator will pull the belt out to about the slack desired and simultaneously push the switch 56 and then release the belt and the switch. The belt will rewind slightly, e.g. less than one inch in this embodiment of the invention, before the pawl tip 84 engages the root area 74a on the rib 74 to stop further belt rewind.

The pawl 62 has an operating rear end portion 80 which, when the pawl is in locking position, is oriented approximately parallel to the sidewalls 32a,32b of the frame 18. The pawl 62 has a generally triangular head 82, defining a tip 84 for engaging root area 74a at the leading side of a rib 74 in abutting contact. The head 82 intersects the rear portion 80 at a slightly obtuse angle, so that the tip 84 of the head 82 is the outermost point on the head relative to its pivot, and only the tip of the head 82 engages the wheel 64 when the pawl and wheel are in locking position.

To enable a wearer to shift the retractor 10 out of tensionless mode simply by pulling on the belt 14 and withdrawing a predetermined length of the belt 14 from the retractor 10, a camming surface 76 is defined on the pawl 62 adjacent the wheel 64 for engaging the inclined backside 74b on a rib. The ribs are each spaced from each other by a flat area 75 on the web 72 of the wheel 64 which allows a belt protraction of a predetermined distance, e.g. one inch in a so-called comfort zone. That is, when the belt is protracted and the wheel 64 is rotated to shift the shift tooth 74 in FIG. 5 to the left, the pawl tip 84 slides along the flat area 75 between ribs 74. Herein, the distance between ribs is equivalent to about one inch of belt extension. Manifestly, this distance between ribs may be varied to provide more or less comfort zone protraction without disabling the pawl. If the belt is protracted less than the spacing between adjacent ribs and then released, the belt rewind spring will turn the reel to shift the rib 74 to the right to bring the rib root 74a into blocking engagement with the pawl tip 84 thereby preventing further belt rewind and maintaining the tensionless mode. On the other hand, if the belt is manually protracted to one inch, then the inclined surface 76 on the rear side of the pawl abuts and is cammed outwardly by the inclined rear surface 74b of the rib and, as will be explained, pushes the solenoid plunger to its other disabling state. Thus, it will be seen that when the pawl 62 is in locking position, a protraction of the belt 14 through a distance greater than the comfort belt length cams the pawl 62 away from the wheel 64 to released position, thus shifting the retractor 10 out of tensionless mode. Accordingly, the wearer need not operate the switch 56 or open the door 22 of the vehicle 12 in order to have the belt 14 retract.

Also, it will be seen from the foregoing that while in tensionless mode, the retractor 10 provides a "comfort zone", i.e., that it permit protraction of small amounts of belt 14, due to minor changes in the user's position, while remaining in tensionless mode. That is, the ribs 74 are spaced from one another by a sufficient distance that about one inch of belt 14 may be withdrawn from the reel without disengaging the pawl 62 from the wheel 64. If further protraction occurs, the retractor will be shifted out of tensionless mode, and must be manually reset if it is to provide subsequent tension relief.

Figure 6:
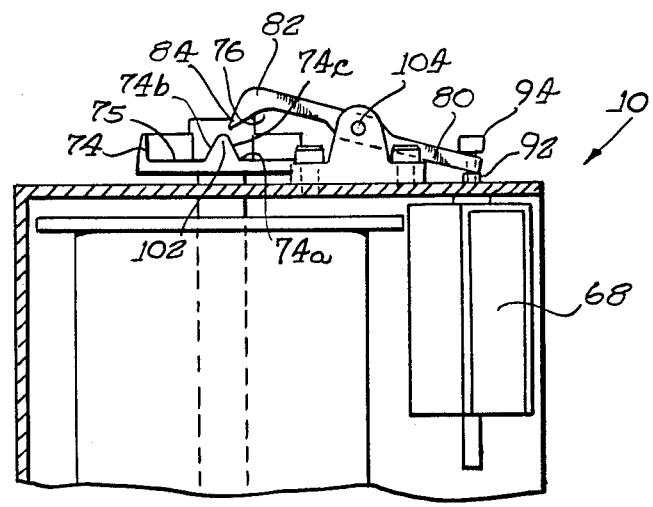
FIG. 6 is a fragmentary view also taken along line 5—5 in FIG. 2, showing the tension-relieving system in open position, permitting application of tension to the belt.
Figure 8:
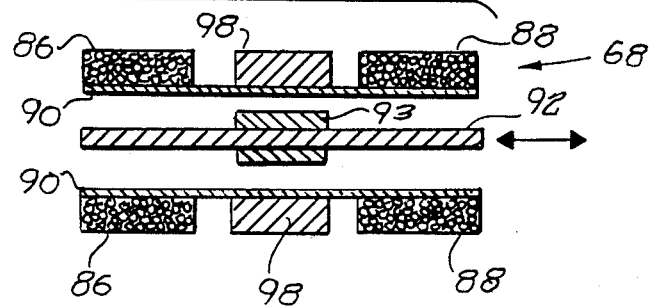
FIG. 8 is a schematic illustration of the preferred solenoid having a magnetic force detenting means to hold the solenoid plunger in two positions.

The above-mentioned electromechanical device 68 which controls the position of the pawl 62 is preferably a double-acting solenoid, which comprises first and second coils 86, 88 (FIG. 8) mounted on a frame 90 and axially spaced from one another, and an actuating member in the form of solenoid plunger 92 extends through the coils 86, 88 and is connected to the pawl 62 by a suitable fastener 94. The solenoid plunger 92 is axially movable between a retracted position, shown in FIG. 6, corresponding to the unlocked position of the pawl, and an extended position, shown in FIG. 5, corresponding to the locked position of the pawl. As best seen in FIG. 8, the solenoid plunger 92 has a cylindrical piece of steel 93 fixed centrally to the plunger 92 and has an outer encircling permanent magnet 98 disposed between the two coils. The solenoid 68 is disposed beneath the reel 20 with its axis parallel to that of the reel. An electrical receptacle facilitates electrical connection of the solenoid to the switches and power source, which is preferably the battery of the automobile 12.

To shift the retractor 10 from normal to tensionless mode, the first coil 86 of the solenoid 68 is energized, driving the actuating member 92 to its extended position, and pivoting the pawl 62 to its locking position. The web 72 acts as a stop for the head 82 of the pawl. To shift the retractor 10 out of tensionless mode, the second coil 88 is energized to displace the actuating member 92 to its withdrawn position, pivoting the pawl 62 to its unlocked position.

To prevent undesired shifting of the tension-relieving mechanism 52 into or out of tensionless mode, and to allow the coils 86 or 88 to be de-energized, a detenting or stabilizing means is provided. Herein, the illustrated detenting means comprises the permanent magnet 98 disposed between the coils 86,88 of the solenoid 68 to provide continuous resistance to displacement of the actuating member 92. The preferred permanent magnet 98 is mounted on the solenoid frame 90 and encircles the steel cylinder 93 mounted on the plunger 92. The frame steel piece and the permanent magnet create two magnet fields each of which holds the plunger by magnet force in either its extended or retracted position. This provides a relatively simple and easily-assembled stabilizing mechanism which will hold the solenoid plunger 92 in either of its extended or retracted positions while the solenoid coils are de-energized. The solenoid 68 and actuating member 92 are preferably disposed horizontally with respect to the vehicle 12, which further contributes to the dynamic stability of the actuating member 92.

In order to facilitate shifting of the pawl 62 between its respective positions, and to enable the pawl 62 to function effectively in preventing rotation of the wheel 64 when the retractor is in tensionless mode, each rib 74 has a pair of side faces 74b and 74c, each disposed at an angle of about 115° to the plane of rotation of the wheel 64. The side faces 74b and 74c of each rib 74 intersect at a peak 102.

The pawl 62 is preferably of one-piece construction. The illustrated pawl 62 is supported substantially at its midpoint by a pin 104 mounted on a pivot block 106 attached to the sidewall of the frame. The tail end 108 of the pawl 62 is slotted to receive the fastener 94 and permit the pawl to pivot with respect to the fastener 94 and the actuating member 92 of the solenoid 68.

The preferred door switch 58 is a normally open switch, which is preferably located adjacent the door latch actuating mechanism so that when the door is being unlatched and opened from the inside, the door switch is operated by means 111, which mechanically closes the switch 58 momentarily which is all that is needed to cause the solenoid 68 to be energized and shifted to its release position. If the solenoid is already at and detented in its release position, then the solenoid plunger doesn't move. If the solenoid plunger is in its tension-relieving position, then its operation by closing the switch 58 causes the pawl 62 to pivot to the release position shown in FIG. 6 allowing the belt to automatically rewind.

From the foregoing, it will be appreciated that the invention provides a novel and improved retractor for an automotive safety belt system. The tensionless system is indicated by depressing a manually-operable, remote control switch and the system avoids any need for automatic shifting into tensionless mode by belt extension and release to set as in most conventional systems. Also, a door switch ensures that the belt will be retracted after use and the device will be automatically shifted from its tensionless mode to a rewind mode if the user extends the belt more than the comfort zone length. The electrical remote control enables great flexibility in choosing the location of the manual switch. The tension-relieving mechanism is made up of relatively few components to facilitate assembly, and enable the retractor to be manufactured economically. The invention is not limited to the above-described embodiment, but rather is defined by the following claims.

What is claimed is:

1. A seat belt retractor apparatus for manual operation into and from a tension-relieving position, said apparatus compulsion:
    a seat belt retractor having a reel and a belt, which is wound on said reel for protraction or retraction,
    biasing means biasing the belt to rewind to a fully-wound position after usage of the seat belt,
    a selectively operable tension-relieving means positionable in a tension-relieving position for holding the reel and belt against the rewind force of the biasing means to relieve belt tension on a user, the tension-relieving means being positionable in a release position to allow the belt to be rewound,
    a solenoid with a solenoid actuator movable to a first position to shift the tension-relieving means to the release position,
    mechanical means in said tension-relieving means to shift the tension-reliving means to its release position on belt protraction beyond a predetermined length,
    circuit means for the solenoid including a manually operable switch means operable by a user to energize the solenoid and shift the actuator to shift the same to its first position to place the tension-relieving means in the tension relieving position said solenoid being movable with energization to shift its actuator to its first or second position, said actuator staying at the shifted position with de-energization of the solenoid.

2. A seat belt retractor apparatus in accordance with claim 1 further comprising a second electrical switch operable to operate the solenoid actuator to cause the tension-relieving means to move to its release position.

3. In combination with an automobile having at least one seat and at least one door, as safety belt system for use in restraining a person positioned in said seat, said safety belt system including at last one safety belt, a retractor for attestable securing one end of said safety belt, and means for securing the opposite end of said safety belt, said retractor comprising:
    a frame;
    a reel supported for rotation on said frame, said safety belt being partially wound on said reel;
    biasing means to bias said reel for rotation in a predetermined direction to effect retraction of said belt;
    automatically-operated locking means which permit protraction of said belt under normal conditions but prevent protraction during rapid deceleration; and
    manually-operable tension-relieving means for selectively locking said reel against rotation by said biasing means, said tension-reliving means comprising:
    a wheel fixed to said reel for rotation therewith,
    wheel-engaging means movable between a first position engaging said wheel to prevent retraction of said belt and a second position clear of said wheel to permit retraction,
    an electromechanical device for displacing said wheel-engaging means, and
    a manually-operable switch for controlling said electromechanical device, said manually-operable switch being disposed for user access so as to be operable directly, without requiring movement of other components of the retractor, said manually-operable switch being the only means for shifting said wheel-engaging means from said second position to said first position, said electromechanical device comprising a solenoid which includes a frame, an actuating member disposed for axial movement on said frame between a withdrawn position corresponding to the second position of said wheel-engaging means and an extended position corresponding to said first position of said wheel-engaging means, a first coil which, when activated, shifts said actuating member from said retracted position to said extended position, and a second coil which, when activated, shifts said actuating member from said extended position to said withdrawn position; said actuating member being pivotally connected to said wheel-engaging means.

4. A combination in accordance with claim 1 further comprising stablizing means for providing continuous predetermined magnetic force to said actuating member.

5. A combination in accordance with claim 4 further comprising a second switch for automatically effecting movement of said wheel-engaging means to said second position when said door is opened.

6. A combination in accordance with claim 3 wherein said manually operable switch is positioned directly adjacent said seat for visibility and convenient access by one seated therein.

7. A seat belt retractor apparatus for manual operation to and from a tension-relieving position, said apparatus comprising:
    a seat belt;
    a seat belt retractor having a reel;
    said seat belt wound on said reel for protraction and retraction therefrom;

biasing means for biasing said reel to rewind said seat belt to a fully-wound position;

a selectively operable means for relieving belt tension on a user, said tension-relieving means positionable in one of a tension-relieving position, wherein said seat belt and reel are prevented from being rewound by said biasing means, and a release position allowing said seat belt to be rewound on said reel;

a solenoid having an actuator movable to a first position to shift the tension-relieving means to said tension relieving position and movable to a second position to shift said tension-relieving means to the release position, and means for releasably holding said actuator in said first and second positions;

a source of electrical energy;

circuit means coupled to said energy source and to said solenoid;

said circuit means having a manual switch means operable by a user for momentarily energizing the solenoid to shift the actuator to said first position, which solenoid is automatically deenergized after shifting of said tension-relieving means to said tension-relieving position; and, means for moving the actuator from said first position to said second position during solenoid deenergization.

8. A seat belt retractor apparatus in accordance with claim 7 wherein the solenoid actuator is a movable plunger, and the means to releasably hold the solenoid actuator includes a magnet in the solenoid to establish a magnetic field to hold the plunger in either of the first and second positions.

9. A seat belt retractor apparatus for manual operation into and from a tension-relieving position, said apparatus comprising:

a seat belt;

a seat belt retractor having a reel, the belt wound on said reel for protraction or retraction;

biasing mans biasing the reel to rewind to a fully -wound position after usage of the seat belt, a selectively operable tension-relieving means positionable in a tension-relieving position for holding the reel and belt against the rewind force of the biasing means to relieve belt tension on a user, the tension-relieving means positionable in a release position to allow the belt to be rewound, said selectively operable tension-relieving means including a solenoid and a plunger, said solenoid being operable to move its plunger to either a tension-relieving position or to the release position and to have its plunger remain thereafter with de-energization of said solenoid, mechanical means in said tension-relieving mean to shift the tension-relieving means to its release position upon belt extension beyond a predetermined length, a manually operated actuator movable by a manual operation to shift the tension-reliving means into the tension-relieving position, and memory means in the tension-relieving means allowing the belt to be extended through a predetermined distance and then causing the belt to be rewound to return to the initial tension-relieving position, extension of the belt beyond the predetermined distance causing the mechanical means to shift the tension-relieving means to its release position.

10. An automotive safety belt retractor comprising:

a frame having means to enable installation of the retractor in an automobile;

a reel supported for rotation on said frame;

a safety belt assembly including a belt with a first and a second end, which belt is partially wound on said reel and has one of said first and second ends secured thereby, and means for securing the other of said first and second ends of said belt;

biasing means for biasing the reel for rotation in a predetermined direction to effect retraction of the belt;

automatically operated locking means which permits protraction of the belt under normal conditions and prevents protraction during rapid automobile deceleration; a tension-relieving mechanism having a first configuration which locks the reel against rotation by the biasing means, and a second configuration which permits reel rotation without interference;

a source of electric power; and, control means for shifting the tension-relieving mechanism between said first and second configurations, the control means coupled to-said source of electric power and comprising an electromechanical device for effecting such shifting upon receiving a predetermined signal, and a switch means capable of signalling said electromechanical device to shift the tension-relieving mechanism between said first and second configurations, said switch means being visible and directly accessible for manual operation, said control means further comprising a second switch, said switch operable to sense a condition associated with belt use termination and to automatically shift said tension-relieving mechanism from said first position to said second position automatically upon sensing said termination condition.

11. An automotive safety belt retractor comprising:

a frame having means to enable installation of the retractor in an automobile;

a reel supported for rotation on said frame;

a safety belt assembly including a belt with a first and a second end, which belt is partially wound on said reel and has one of said first and second ends secured thereby, and means for securing the other of said first and second ends of said belt;

biasing means for biasing the reel for rotation in a predetermined direction to effect retraction of the belt;

automatically operated locking means which permits protraction of the belt under normal conditions and prevents protraction during rapid automobile deceleration; a tension-relieving mechanism having a first configuration which locks the reel against rotation by the biasing means, and a second configuration which permits reel rotation without interference;

a source of electric power; and, control means for shifting the tension-relieving mechanism between said first and second configurations, the control means coupled to-said source of electric power and comprising an electromechanical device for effecting such shifting upon receiving a predetermined signal, and a switch means capable of signalling said electromechanical device to shift the tension-relieving mechanism between said first and second configurations, said switch means being visible and directly accessible for manual operation, said tension-relieving mechanism comprising a wheel affixed to said reel for rotation therewith and a pawl movable by said electromechanical device between a first position engaging said wheel and a second position clear of said wheel, said wheel having a plurality of radially-extending ribs thereon for engagement with said pawl, said wheel having a plane of rotation and each of said ribs having at least one surface, which is disposed at an angle of about 115° to the plane of rotation of the wheel, for engaging said pawl.

12. An automotive safety belt retractor comprising:

a frame having means to enable installation of the retractor in an automobile;

a reel supported for rotation on said frame;

a safety belt assembly including a belt with a first and a second end, which belt is partially wound on said reel and has one of said first and second ends secured thereby, and means for securing the other of said first and second ends of said belt;

biasing means for biasing the reel for rotation in a predetermined direction to effect retraction of the belt;

automatically operated locking means which permits protraction of the belt under normal conditions and prevents protraction during rapid automobile deceleration; a tension-relieving mechanism having a first configuration which locks the reel against rotation by the biasing means, and a second configuration which permits reel rotation without interference;

a source of electric power; and, control means for shifting the tension-relieving mechanism between said first and second configurations, the control means coupled to said source of electric power and comprising an electromechanical device for effecting such shifting upon receiving a predetermined signal, and a switch means capable of signalling said electromechanical device to shift the tension-relieving mechanism between said first and second configurations, said switch means being visible and directly accessible for manual operation, said control means further comprising a second switch, said switch operable to sense a condition associated with belt use termination and to automatically shift said tension-relieving mechanism from said first position to said second position automatically upon sensing said termination condition, said tension-relieving mechanism comprising a wheel affixed to said reel for rotation therewith and a pawl movable by said electromechanical device between a first position engaging said wheel and a second position clear of said wheel, said electromechanical device comprising a double-acting solenoid having an axially movable actuating member.

13. A safety belt retractor in accordance with claim 12 wherein said double-acting solenoid comprises a frame supporting said actuating member, and having a first end, a second end, and a pair of coils, one of said coils at each of said first and second ends on said frame for controlling axial displacement of said actuating member.

14. A safety belt retractor in accordance with claim 12 wherein said solenoid device includes a permanent magnet for attracting said actuating member to provide for stability thereof.

15. A safety belt retractor as claimed in claim 12 wherein said wheel defines a plane of rotation and further comprises a plurality of ribs mounted on said wheel, said ribs extending generally normal from said wheel plane of rotation.

16. A safety belt retractor as claimed in claim 4 wherein said ribs are separated by an arc distance, which arc distance provides a comfort zone for said tension-relieving mechanism between said reel-lock position and the reel rotation position.

* * * * *

UNITED STATES PATENT AND TRADEMARK OFFICE
CERTIFICATE OF CORRECTION

PATENT NO. : 4,946,196
DATED : August 7, 1990
INVENTOR(S) : Doty

It is certified that error appears in the above-identified patent and that said Letters Patent is hereby corrected as shown below:

Column 2, Line 55, delete ",".

Column 5, Line 22, after "engaging" insert --the--.

Column 5, Line 68, after "distance" insert --so--.

Column 7, Line 53, change "tension-reliving" to --tension-relieving--.

Column 8, Line 2, after "as" insert --a--.

Column 8, Line 19, change "tension-reliving" to --tension-relieving--.

Column 8, Line 51, change "stablizing" to --stabilizing--.

Column 9, Line 39, change "mans" to --means--.

Column 9, Line 53, change "mean" to --means--.

Column 9, Line 58, change "reliving" to --relieving--.

Column 10, Line 23, change "to-said" to --to said--.

Column 10, Line 62, change "to-said" to --to said--.

UNITED STATES PATENT AND TRADEMARK OFFICE
CERTIFICATE OF CORRECTION

PATENT NO. : 4,946,196

DATED : August 7, 1990

INVENTOR(S) : Doty

It is certified that error appears in the above-identified patent and that said Letters Patent is hereby corrected as shown below:

Column 11, Line 37, change "to-said" to --to said--.

Signed and Sealed this

Nineteenth Day of May, 1992

Attest:

DOUGLAS B. COMER

*Attesting Officer*  *Acting Commissioner of Patents and Trademarks*